United States Patent [19]

Moiso et al.

[11] 4,269,769
[45] May 26, 1981

[54] DIAZO COMPOUNDS OBTAINED BY COUPLING ACETOACETANILIDES WITH TETRAZOTIZED DIAMINOBENZANILIDES

[75] Inventors: Ugo Moiso; Vincenzo Massabo; Danilo Domenis, all of Saronno, Italy

[73] Assignee: Aziende Colori Nazionali Affini ACNA S.p.A., Saronno, Italy

[21] Appl. No.: 34,000

[22] Filed: Apr. 27, 1979

Related U.S. Application Data

[63] Continuation of Ser. No. 274,620, Jul. 24, 1972, abandoned.

[30] Foreign Application Priority Data

Jul. 26, 1971 [IT] Italy .................................. 7669 A/71
Dec. 29, 1971 [IT] Italy ................................ 33062 A/71

[51] Int. Cl.³ .................. C09B 35/30; C09B 35/32; C09D 11/02; C09D 17/00
[52] U.S. Cl. .................................. 260/176; 106/23; 106/288 Q; 260/160; 564/168; 564/200
[58] Field of Search ................................ 260/160, 176

[56] References Cited

U.S. PATENT DOCUMENTS

| 1,560,949 | 11/1935 | Stusser | 260/160 |
|---|---|---|---|
| 1,851,097 | 3/1932 | Hentrich et al. | 260/176 X |
| 1,878,471 | 9/1932 | Dobmaier | 260/160 |
| 2,172,712 | 9/1939 | Roos | 260/160 |
| 2,200,414 | 5/1940 | Cliffe | 260/160 |
| 2,216,229 | 10/1940 | Cliffe | 260/160 |
| 2,236,618 | 4/1941 | Cliffe | 260/178 |
| 2,283,667 | 5/1942 | Cliffe | 260/168 |
| 2,571,990 | 10/1951 | Stratton | 8/46 |
| 2,741,657 | 4/1956 | Schmid et al. | 260/160 |
| 2,936,305 | 5/1960 | Forter et al. | 260/175 |

*Primary Examiner*—Floyd D. Higel
*Attorney, Agent, or Firm*—Hubbell, Cohen, Stiefel & Gross

[57] ABSTRACT

Yellow pigments having a greenish hue are represented by the formula:

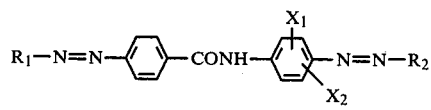

wherein $X_1$ and $X_2$ may be the same or different from one another and each is hydrogen, halogen (chlorine, fluorine or bromine), lower alkyl or alkoxy having from 1 to 3 carbon atoms; and wherein $R_1$ and $R_2$ may be the same or different from one another and each is the residue from an acyl-acetyl-amino-aromatic coupling agent or the residue from a pyrazolone coupling agent. Pigments are obtained by coupling of (1) an aceto-acetyl-amino-aromatic compound or (2) of a pyrazoline, with a 4,4'-diamino-benzanilide. The yellow pigments have the characteristic of having a high tintorial yield, a high degree of purity of tone (brightness), a good fastness to light, and good resistance to organic solvents. These pigments are particularly useful in the polychrome graphic industry.

2 Claims, No Drawings

DIAZO COMPOUNDS OBTAINED BY COUPLING ACETOACETANILIDES WITH TETRAZOTIZED DIAMINOBENZANILIDES

This is a continuation of application Ser. No. 274,620, filed July 24, 1972, now abandoned.

BACKGROUND OF THE INVENTION

1. Field of the Invention

The present invention relates to certain novel diazo pigments, to a method of their preparation, and to their application in the pigmentation of organic materials.

2. Description of the Prior Art

The demand for yellow pigments with a high tinctorial yield, having a high degree of purity of tone (brightness), a good fastness to light, and good resistance to organic solvents, has been increasing, particularly in the polychrome graphic industry.

Printing inks prepared with yellow pigments should display good rheological properties, even at high pigment concentrations, and prints prepared with them should be bright and transparent.

It is known that particularly valuable yellow pigments are those which show a greenish yellow hue, inasmuch as one of the basic uses of yellow pigments is in obtaining, in admixture with blue pigments, green colors. Yellow pigments having a greenish yellow hue, when admixed with blue pigments, give green colors that tend to be both purer and brighter.

The need for yellow pigments to be of high tinctorial yield, good transparency, and of a satisfactory light fastness, has heretofore primarily been satisfied by the benzidine pigments. These pigments have, however, certain limits in various industrial applications because they show a high oil absorption, which tends to decrease the flowability of the pigments present in high concentration. Moreover, such pigments do not exhibit an altogether satisfactory transparency, which characteristic is very important in graphic polychrome printing.

In addition, benzidine pigments have the disadvantage that their preparation involves the handling and use of benzidine derivatives such as, for instance, 3,3'-dichloro-benzidine, which is highly toxic and requires very strict standards for handling and useage.

SUMMARY OF THE INVENTION

We have surprisingly found that certain novel diazo pigments exhibit, in comparison to benzidine pigments, the advantage of yielding yellow hues with a markedly more greenish hue and of a considerably greater transparency. Moreover, our novel pigments are easily prepared without the need for elaborate safety measures.

The pigments of our invention are of the following Formula (I)

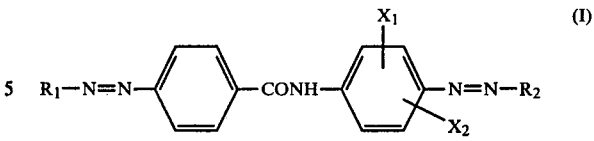

wherein $X_1$ and $X_2$ may be the same or different from one another and each is hydrogen, halogen (chlorine, fluorine or bromine), lower alkyl or alkoxy having from 1 to 3 carbon atoms; and wherein $R_1$ and $R_2$ may be the same or different from one another and each is the residue from an acyl-acetyl-amino-aromatic coupling agent or the residue from a pyrazolone coupling agent.

Preferred diazo pigments of our invention are of the Formula (II)

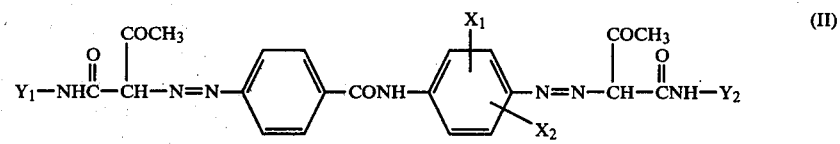

wherein $X_1$ and $X_2$ are as previously defined; and wherein $Y_1$ and $Y_2$ may be the same or different from one another and each is phenyl; substituted phenyl wherein the substituents are halogen (chlorine, fluorine or bromine), alkyl having from 1 to 3 carbon atoms, alkoxy having from 1 to 3 carbon atoms, carboxamindo, trifluoromethyl, cyano, or nitro; the pyrazolonyl radical,

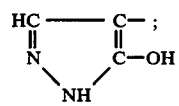

or a substituted pyrazolonyl radical such as

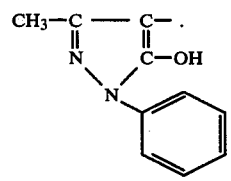

The pigments of Formula (I), when compared with the monoazo pigments of the Yellow Hansa type, such as for instance the pigment obtained by the coupling of 5-nitro-2-methoxy-aniline diazo with aceto-acetyl-amino-2-methoxy-benzene, show a much greater tinctorial yield. For instance, in the case of photogravure printing inks, the tinctorial yield is generally more than double.

The pigments of Formula (I) may be prepared by the coupling, according to conventional prior art methods, of one mole of the tetrazo-derivative of a 4,4'-diamino-benzanilide (DABA) of the Formula (III)

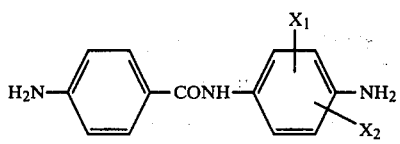

wherein $X_1$ and $X_2$ are as previously defined, with two moles of a coupling agent or of two different coupling agents of the type commonly utilized in the preparation of benzidine pigments.

Examples of suitable coupling agents include the following: 1-aceto-acetyl-amino-benzene; 1-aceto-acetyl-amino-2-methoxy-benzene; 1-aceto-acetyl-amino-2-methyl-benzene; 1-aceto-acetyl-amino-4-methyl-benzene; 1-aceto-acetyl-amino-2,4-dimethyl-benzene; 1-aceto-acetylamino-2-chloro-benzene; 1-aceto-acetyl-amino- 2,5-dimethoxy benzene; 1-aceto-acetyl-amino-2,5-dimethoxy-4-chloro-benzene; 1-aceto-acetyl-amino-2,4-dimethoxy-5-chloro-benzene; 1-aceto-acetyl-amino-2-methoxy-4-chloro-benzene; 1-aceto-acetyl-amino-2-methoxy-5-chloro-benzene; 1-aceto-acetyl-amino-4-nitro-benzene; 1-aceto-acetyl-amino-2,5-dimethoxy-4-cyano-benzene; 1-aceto-acetyl-amino-2-ethoxy-benzene; 1-aceto-acetyl-amino-4-ethoxy-benzene; 1-aceto-acetyl-amino-4-acetyl-amino-benzene; 2-aceto-acetyl-amino-naphthalene; 1-aceto-acetyl-amino-2-methoxy-5-carboxamido-benzene; 3-aceto-acetyl-amino-pyridine; 1-phenyl-3-methyl-5-pyrazolone; 5-aceto-acetyl-amino-benzimidazolone; 1-aceto-acetyl-amino-2,5-dichlorobenzene; 1-aceto-acetyl-amino-2-chloro-5-trifluoromethyl-benzene; 1-aceto-acetyl-amino-2-methyl-4-methoxy-benzene; etc.

In order to accelerate the coupling or to influence the size of the particles or the crystalline shape of the resulting pigment, there may be added to the coupling mass such additives as water-miscible inert organic solvents such as methanol, ethanol, ehtyleneglycol, monomethyl- and monoethylenether, aliphatic cyclic ethers such as dioxane, formic acid, acetic acid, dimethylformamide, tertiary azotized bases such as triethanolamine or pyridine, etc. For this purpose there may also conveniently be used organic solvents that are insoluble in water, such as toluene, chlorobenzene, nitrobenzene or tetrahydro-naphthalene.

There may also be admixed non-ionic, anionic or cationic dispersants such as: aducts of ethylene oxide with alcohols or fatty acids, condensation products of a naphthalene sulphonic acid and formaldehyde, lauryldimethyl-benzyl -ammonium chloride, and, in particular, cetylpyridinium chloride.

The new diazo pigments of this invention precipitate from the reaction mass as the coupling reaction occurs. They are then isolated by filtering and washed according to known methods. Depending on the particular end use contemplated, the pigment cake coming from the filterting stage may be dried and then ground to form a paste, or may be incorporated into organic vehicles by means of a "flushing" operation. The pigments may also be processed with auxiliary substances such as "carrier" resins, in order to obtain granulated material.

The diazo pigments of this invention are suited for the pigmentation of organic materials, mainly for printing inks for the graphic industry.

These pigments may be utilized also for other purposes such as, for instance, in oil paints or in water paints, in varnishes, for the coloring of plastic materials such as polyethylene, polystyrene, cellulose esters, etc.

They may be used in bulk dyeing of cellulose acetate as well as in the pigment printing and dyeing of textiles.

The following examples will further illustrate our invention.

EXAMPLE 1

Into a glass were poured 22.7 parts (=0.1 mole) of 4,4'-diamino-benzanilide

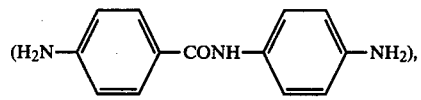

150 parts of water, and the mixture was then heated up to 60° C. There was then added a solution of 91 parts in volume (0.9 mole) of HCl at 30% concentration.

The amine at first passed into solution with a brown coloring and then, upon cooling down, started to precipitate. the whole was permitted to cool down under stirring until a temperature of 20° C. was reached, whereupon the mass was brought down to −4° C. by adding ice to it. The disazotation was then carried out by rapidly pouring in 15.2 parts (0.216 mole) of $NaNO_2$ dissolved in 60 parts of water. The suspension passed substantially completely into solution after 5 minutes. This achieved, the mixture was stirred for about 60 minutes at a temperature of less than 0° C. Then a clarification was effected by adding 2 parts of carboparaffin. After 10 minutes the solution was filtered. Thereby there was obtained a clear solution of a yellow-orange hue. Residual excess of nitrous acid was removed by means of sulfamic acid.

Into a glass having a holding capacity about 6 times greater than that of the first glass, were poured:
600 parts of water
43.6 parts of aceto-acetyl-meta-xylidine*
22 parts by volume of NaOH 36°Bé

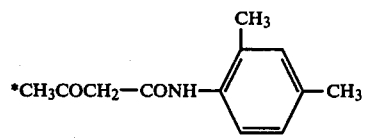

The whole was then stirred to obtain a complete solution. To this there were then admixed:
0.72 part of cetylpyridine chloride and
109 parts of HCOONa.

The solution was then stirred and the pH was gradually brought to a slightly acid value (5-6) by slowly adding at 20° C., a solution containing 27.2 parts of 30% HCl diluted in 80 parts of water. In the suspension thus obtained there was poured, below the level of the liquid, at 20° C., the previously prepared diazo solution. Coupling occurred after about 5 hours. The mass was permitted to stand overnight. The reaction mass was then heated in one hour to 90° C. and was then maintained at that temperature for about 30 minutes. The resulting pigment was of the following formula

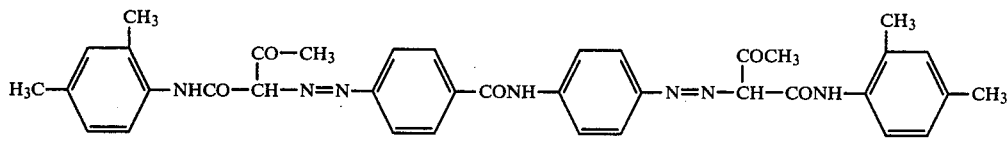

The foregoing pigment was incorporated into a vehicle consisting of 40% of Ca-resinate (Nulix 15 ®) and of 60% of xylol, thereby obtaining a rotogravure printing ink of a yellow hue, characterized by a definitely greener shade and by a much higher transparency than that of the analogous benzidine pigment (Pigment Yellow 13, C.I. 21.100).

EXAMPLE 2

Into a glass were poured
250 parts of water
10 parts by volume of NaOH 36° Bé
17.8 parts by volume of aceto-acetyl-amino-benzene*

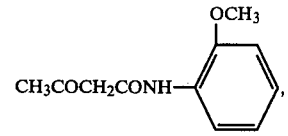

This mixture was then stirred to obtain a solution which was then brought down to a temperature of 0–5° C., and then a solution of 10 parts by volume of icy acetic acid in 10 parts (by weight) of water were slowly dripped into it. This mass was then brought up to 20° C. and there were admixed with it 50 parts of crystalline sodium acetate until slightly acid pH (5–6) was reached.

Into the thus obtained coupling agent suspension was poured under the level of the liquid 0.05 mole of the tetrazo compound prepared as described in the first portion of the preceding example, at a temperature of 20° C. The coupling was achieved in about 5 hours. The temperature was then brought up to 80° C. over a period of 40 minutes, and was maintained at 80° C. for 5 minutes. The mass was then cooled down, filtered, and dried in an oven at 60° C. The resulting pigment was of the following formula

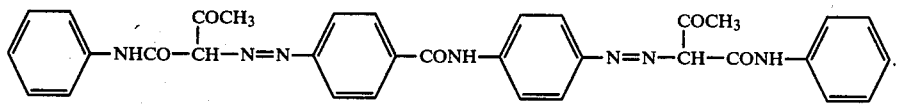

With a yield very close to the theoretical, there was obtained a yellowish powder that, when incorporated into a vehicle consisting of 40% of calcium resinate and of 60% of xylol, yielded a rotogravure printing ink of a yellow tone appreciably more greenish and more transparent than the analogous benzidine pigment (Pigment Yellow 12, C.I. 21.090).

EXAMPLE 3

The same procedure as described in Example 2 was followed, except that 0.1 mole of 2-methoxy-1-acetoacetyl-amino-benzene, of the formula

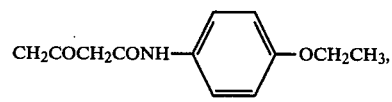

was employed as the coupling agent. Thereby there was obtained a pigment of a yellow hue. This pigment was of the formula

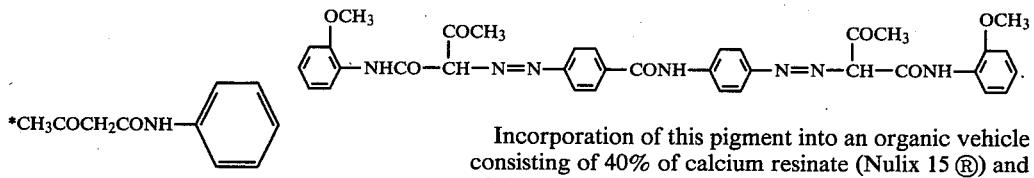

Incorporation of this pigment into an organic vehicle consisting of 40% of calcium resinate (Nulix 15 ®) and of 60% of xylol, yielded an ink having a yellow tone with a markedly more greenish nuance and a considerably higher transparency than is shown in the analogous benzidine pigment (Pigment Yellow 14, C.I. 21.095).

EXAMPLE 4

This example was similar to Example 2, however using 0.1 mole of 4-ethoxy-1-aceto-acetyl-amino-benzene, of the formula was thereby obtained a pigment of yellow hue, this pigment being of the formula

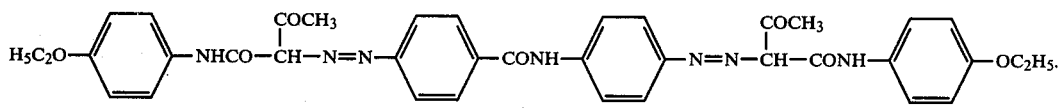

When this pigment was incorporated into a vehicle consisting of 40% of Nulix 15 ® and of 60% of xylol, there resulted a rotogravure printing ink endowed with the same characteristics as those of the preceding examples.

EXAMPLE 5

This example was similar to Example 2, but using 0.1 mole of 1-aceto-acetyl-amino-2,5-dimethoxy-4-chloro-benzene as the coupling agent, to thereby obtain a yellow pigment of the formula

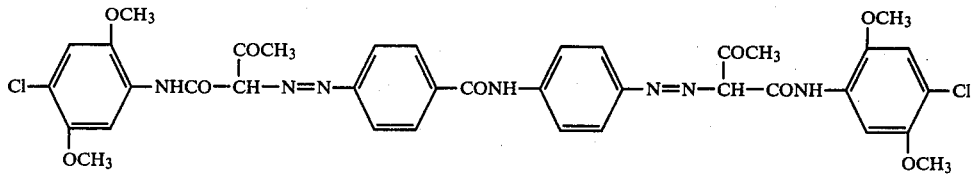

When this pigment was incorporated into a vehicle consisting of 40% Nulix 15 ® and 60% of xylol, it yielded a rotogravure printing ink having a yellow tone with a much more greenish tint and with a considerably higher transparency than that obtainable with the "Giallo Segnale Luce R" (Pigment Yellow 83).

EXAMPLE 6

This example was similar to Example 2, however using as the coupling agent 0.1 mole of 1-phenyl-3-methyl-5-pyrazolone. There was thereby obtained a pigment of the formula

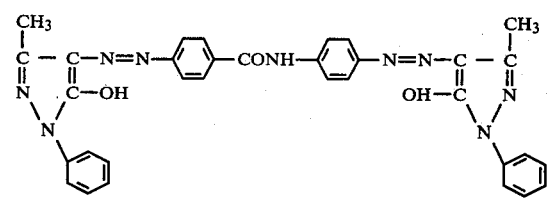

When this pigment was incorporated into a vehicle consisting of 40% of Nulix 15 ® and of 60% of xylol, it yielded a rotogravure printing ink of an orange shade and having a more greenish tint and a considerably higher transparency than that obtainable from the analogous benzidine pigment (Pigment Orange 13, C.I. 21.100).

EXAMPLE 7

Preparation of the various substituted 4,4'-diamino-benzanilides used in Examples 8-11.

(a) 4,4'-diamino-2'-methoxy-benzanilide,

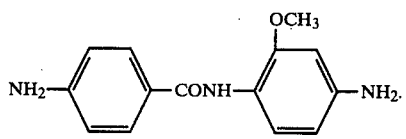

200 parts of thionyl chloride were admixed over a 30 minute period with a suspension of 200 parts of paranitrobenzoic acid in 600 parts of dichlorobenzene and 1.9 parts of dimethylformamide at 80° C. The mixture was gradually heated to 115° C. and kept at this temperature for 4 hours until a complete solution had been obtained. Excess thionyl chloride was eliminted by distillation under vacuum at 115° C. Then, over a 30 minute period, 202 parts of 2-methoxy-4-nitro-aniline were added. The whole was heated to 140° C. for 3 hours, then was cooled to room temperature and the resulting precipitate was filtered by washing, first with methanol and thereafter with water. The dinitro derivative aqueous paste was suspended in 1,700 parts of water and heated to 90° C. At this temperature an aqueous solution of 593 parts of $Na_2S_2$ was admixed over a period of 1 hour, and the whole was maintained at 90-95° C. for a further 3 hours. After cooling to 20° C., the product was filtered, washed with cold water and dried at 60° C., thus obtaining high yields of 4,4'-diamino-2'-methoxy-benzanilide (melting point: 160°-161° C.).

(b) 4,4'-diamino-2'-chloro-benzanilide,

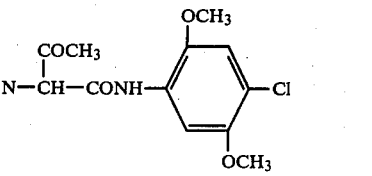

By operating as described under (a) above, but using, instead of 202 parts of 2-methoxy-4-nitro-aniline, 207 parts of 2-chloro-nitro-aniline, high yields of 4,4'-diamino-2'-chloro-benzanilide were obtained (melting point: 194°-197° C.).

(c) 4,4'-diamino-2'methyl-benzanilide,

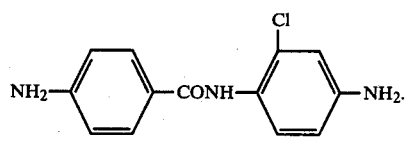

By operating as described under (a) above, but using, instead of 202 parts of 2-methoxy-4-nitro-aniline, 183 parts of 2-methyl-4-nitro-aniline, high yields of 4,4'-diamino-2'-methyl-benzanilide were obtained (melting point: 111°-115° C.).

(d) 4,4'-diamino-2',6'-dichloro-benzanilide,

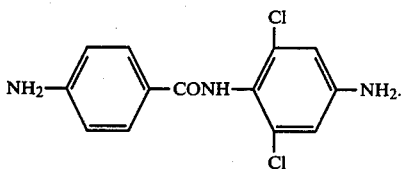

By operating as described under (a) above, but using instead of 202 parts of 2-methoxy-4-nitro-aniline, 248 parts of 2,6-dichloro-4-nitro-aniline, high yields of 4,4'-diamino-2'6'-dichloro-benzanilide were obtained.

EXAMPLE 8

3.86 parts (0.015 mole) of 4,4'-diamino-2'-methoxy-benzanilide (prepared in Example 6A) and 25 parts of water were poured into a beaker. The temperature was raised to 60° C. and then 13.6 parts by volume of 30% HCl were added. The whole was allowed to cool, under stirring, to 20° C. and the temperature of the mass was then lowered, by the addition of ice, to a temperature of −4° C. Diazotation was carried out by rapidly pouring into the beaker 2.28 parts of NaNO₂ (0.033 mole) dissolved in 10 parts of water.

After 5 minutes essentially the entire suspension had gone into a solution. The solution was stirred for about 60 minutes at a temperature of less than 0° C. It was clarified by adding 0.5 parts of activated carbon and, after 10 minutes, by filtering. A limpid yellow-brown solution was obtained, from which the excess nitrous acid was removed by means of a sulfamic acid aqueous solution.

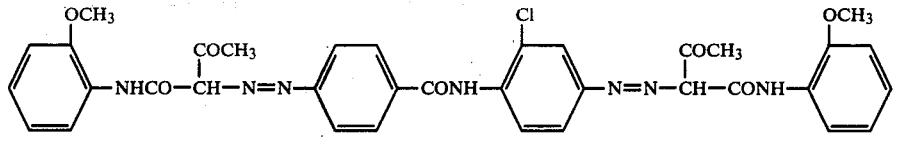

90 parts of water, 3.3 parts by volume of 36° C. Be NaOH, 6.22 parts of 2-methoxy-1-aceto-acetyl-aminobenzene (0.03 mole) were poured into a beaker having a capacity five times greater than that of the previous beaker. The whole was stirred until a complete solution was obtained. 0.108 part of cetyl pyridinium chloride and 16.4 parts of sodium formate were then added.

The whole was stirred and the pH value was brought to a slightly acid value (5–6) by slow drip-wise addition of a solution containing 4.1 parts by volume of 30% HCl diluted with 15 parts of water.

The tetrazo solution previously prepared was poured into the suspension thus obtained, under the liquid level, at 20° C. Coupling was complete after about 3.5 hours. The reaction mass was heated up to 90° C. and was kept at this temperature for about 30 minutes. The resulting precipitate was cooled, filtered, thoroughly washed and dried in an oven at 60° C. A yellow pigment powder was thus obtained. The pigment was of the formula

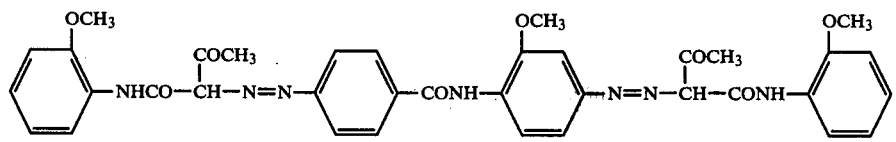

When this pigment was incorporated with a carrier consisting of 40% of calcium resinate and of 60% of xylene, there resulted a highly transparent, yellow-green rotogravure ink having a staining power higher than that of the corresponding benzidine pigment (Pigment Yellow 17, C.I. 21.105).

EXAMPLE 9

The procedure of Example 8 was followed, however employing 3.93 parts of 4,4′-diamino-2′-chloro-benzanilide (prepared in Example 6b) as the diazotizable base. A yellow-green pigment was thus obtained. This pigment was of the formula

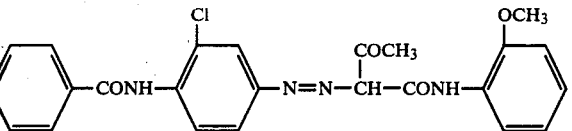

When this pigment was incorporated with an organic carrier containing 40% of calcium resinate and 60% of xylene, there resulted a rotogravure ink exhibiting a less intense and green shade than that obtained in Example 8.

EXAMPLE 10

The procedure of Example 8 was followed, however employing 3.62 parts of 4,4′-diamino-2′-methyl-benzanilide (prepared in Example 6c) as the diazotizable base. A yellow-green pigment was thus obtained. This pigment was of the formula

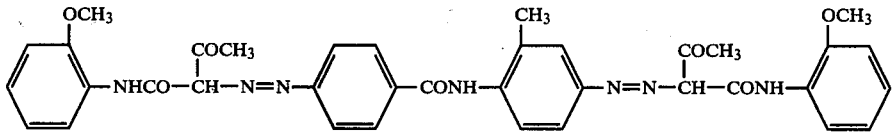

When incorporated with an organic carrier made up of 40% of calcium resinate and of 60% of xylene, there resulted a rotogravure ink having a slightly greener shade than that obtained in Example 8.

EXAMPLE 11

4.44 parts (0.15 mole) of 4,4′-diamino-2′, 6′-dichlorobenzanilide (prepared in Example 6d) and 25 parts of water were poured into a beaker in order to prepare the tetrazo according to the procedure set out in Example 8.

180 parts of water, 6.1 parts of 36° Be NaOH, 8.13 parts of aceto-acetyl-2,5-dimethoxy-4-chloroanilidine were poured into a beaker having a capacity 5 times larger than the preceding beaker, and the whole was stirred until a complete solution was obtained.

It was cooled with ice to 0° C. and subsequently, under intense stirring, the pH was brought to a slightly acid value by permitting a solution of 5.6 parts of Al₂(SO₄)₃.18 H₂O dissolved in 30 parts of water to slowly drip into the solution. The suspension thus obtained was heated to 20° C. The previously prepared tetrazo solution was then poured in, under the liquid level. Coupling was complete after 4 hours. The reaction mass was heated up to 90° C. and maintained at such temperature for 30 minutes. The resulting precipitate was filtered, thoroughly washed, and then dried at 60° C. A yellow pigment powder was obtained. The pigment was of the formula

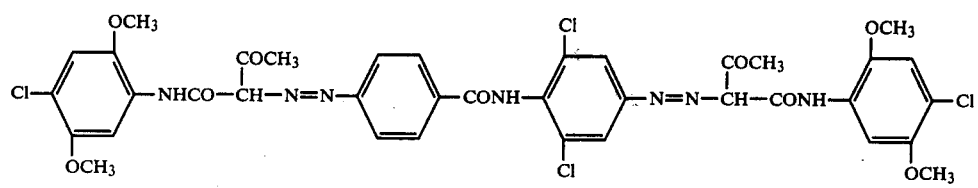

When the pigment was incorporated with a carrier containing 40% of calcium resinate and 60% of xylene, there resulted a rotogravure ink exhibiting considerable transparency and sunlight stability.

Variations can, of course, be made without departing from the spirit and scope of the invention.

Having thus described the invention, what is desired to be secured by Letters Patent and hereby claimed is:

1. A diazo pigment of the formula:

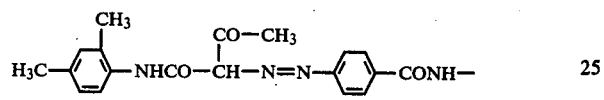

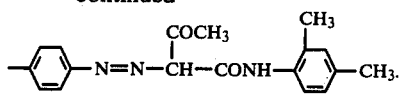

2. A diazo pigment of the formula:

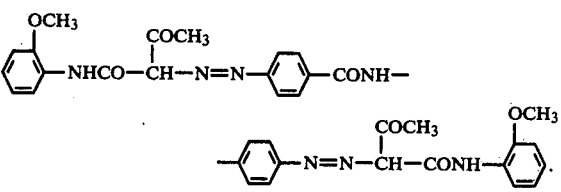

* * * * *